(12) United States Patent
Smith

(10) Patent No.: US 7,084,901 B2
(45) Date of Patent: Aug. 1, 2006

(54) SURVEILLANCE CAMERA WITH FLICKER IMMUNITY

(76) Inventor: Steven Winn Smith, 16129 Bennye Lee Dr., Poway, CA (US) 92064

( * ) Notice: Subject to any disclaimer, the term of this patent is extended or adjusted under 35 U.S.C. 154(b) by 658 days.

(21) Appl. No.: 10/183,620

(22) Filed: Jun. 28, 2002

(65) Prior Publication Data

US 2003/0025790 A1   Feb. 6, 2003

Related U.S. Application Data

(60) Provisional application No. 60/309,048, filed on Aug. 1, 2001.

(51) Int. Cl.
*H04N 7/18* (2006.01)

(52) U.S. Cl. ............... 348/143; 348/145; 348/134; 348/207; 348/208; 348/23; 348/370; 358/505

(58) Field of Classification Search ............... 348/143, 348/134, 145, 207, 370, 208, 23; 358/505
See application file for complete search history.

(56) References Cited

U.S. PATENT DOCUMENTS

| | | | |
|---|---|---|---|
| 5,712,470 A * | 1/1998 | Katz et al. | 235/462.32 |
| 6,271,884 B1 * | 8/2001 | Chung et al. | 348/370 |
| 6,462,820 B1 * | 10/2002 | Pace et al. | 356/430 |
| 6,640,014 B1 * | 10/2003 | Price et al. | 382/255 |

* cited by examiner

*Primary Examiner*—Shawn S. An

(57) ABSTRACT

A video surveillance camera capable of operating with flickering illumination is formed from a time-delay-integration linescan camera in conjunction with a mechanical scanner. The line rate of the camera is adjusted to provide an integration time substantially equal to an integer number of periods of the lighting flicker.

13 Claims, 3 Drawing Sheets

Prior Art

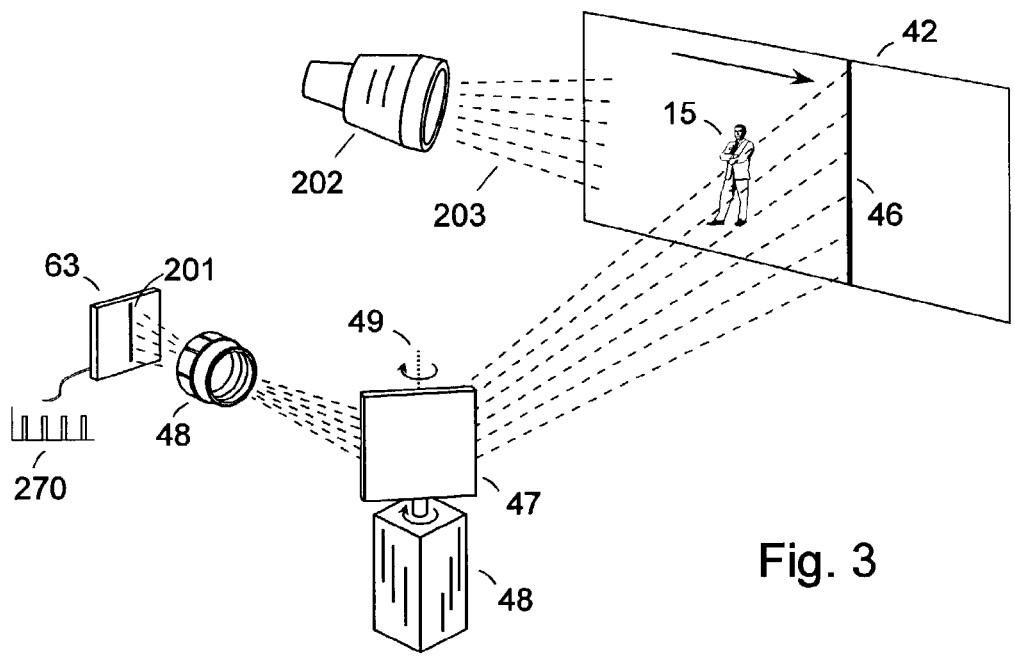
Fig. 3
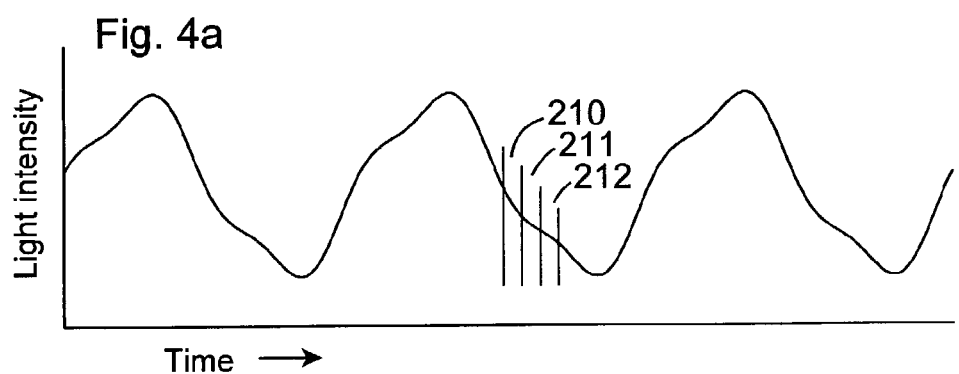
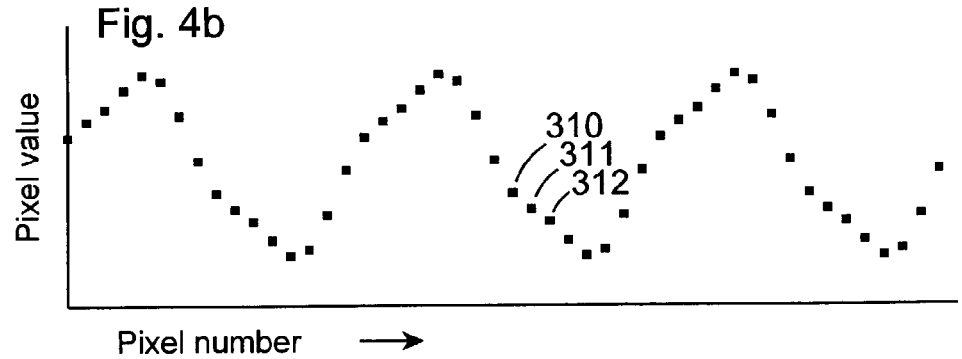

SURVEILLANCE CAMERA WITH FLICKER IMMUNITY

This aplication claims the benefit of provisional application No. 60/309,048 filed Aug. 1, 2001.

BACKGROUND OF THE INVENTION

This Invention relates to the acquisition and display of a sequence of images, and particularly to video cameras and recorders used to document criminal activity and other events occurring in a monitored area.

Video surveillance cameras are required to operate under a wide range of lighting conditions, from natural sunlight to indoor and outdoor manmade illumination. A particularly common lighting technology is the gas discharge lamp, the most prevalent examples of which are fluorescent and sodium vapor lights. These devices operate by applying a large alternating voltage across a gas filled enclosure, usually with the same frequency as the power line, i.e., 50 or 60 Hz. One pulse of light is emitted from the enclosed gas on the positive excursion of the voltage, and another pulse on the negative excursion. Accordingly, the light emitted from gas discharge lamps pulsates or flickers at twice the line frequency, i.e., 100 or 120 Hz. This flicker rate is fast enough that it cannot be detected with the human eye, and therefore these lighting systems can be use in general applications, both indoor and outdoor.

Video surveillance cameras capture images far faster than the human eye, and are therefore susceptible to the degrading effects of lighting flicker. Conventional video surveillance cameras, using two-dimensional image sensors, overcome this problem by acquiring each image in phase synchronization with the power line frequency. In the most common case, this involves acquiring 50 fields/second at a power line frequency of 50 Hz, or 60 fields/second at 60 Hz. This results in each image in the video sequence being acquired under the same lighting conditions, thereby eliminating the effects of lighting flicker.

However, the problem of flicker is much more severe in video surveillance systems that utilize linescan image sensors, such as disclosed in U.S. Pat. No. 6,757,008, which is incorporated herein by reference. These systems operate by acquiring each image line by line, rather than an entire image at once. Accordingly, each line must be acquired at a rate that is far higher than the power line frequency, typically 5,000 to 30,000 lines/second. This results in each line being acquired under a different lighting condition, depending on the particular phase of the periodic illumination. The acquired image therefore shows pronounced bright and dark stripes that degrade the image's usefulness.

BRIEF SUMMARY OF THE INVENTION

The present Invention is directed at eliminating the degrading effect of gas discharge lamp flicker in a linescan surveillance system. This improvement is accomplished through the use of a two-dimensional image sensor operated in a Time Delay Integration (TDI) mode, in conjunction with a line rate that is selected to provide flicker immunity. In particular, if the variable T represents the number of lines integrated in the TDI image sensor, F represents the power line frequency, and N is an integer number greater than zero, the line rate of the Inventive system is given by the expression: $2 \times T \times F / N$.

It is the goal of the Invention to provide a high resolution surveillance system capable of being used in a wide variety of settings. It is a further goal to enable the surveillance system to operate with gas discharge lamps providing the illumination. Still a further goal is to eliminate the bright and dark stripes appearing in linescan surveillance images due to lighting flicker. Yet an additional goal is to increase the dynamic range of linescan surveillance video by illuminating the flicker component of the video signal.

BRIEF DESCRIPTION OF THE DRAWINGS

FIG. 3 is a schematic depiction in accordance with the inventive video surveillance system.

FIGS. 4A and 4B are graphs in accordance with a linescan video surveillance system.

DETAILED DESCRIPTION OF THE INVENTION

Prior art video surveillance equipment, commonly called Closed Circuit Television (CCTV), acquires and stores a surveillance record in the same format as used in broadcast television. This is a frame rate of 30 images per second, with each image containing 480 lines, and with a bandwidth sufficient to provide approximately 640 resolvable elements per line. Further, the images may be taken in an interlaced mode, where the even and odd fields are sequentially acquired at a rate of 60 fields per second.

These field and frame rates are critically important in eliminating interference from 60 Hz lighting flicker. The gas discharge lamp is the most common source of lighting in commercial applications. For indoor use, this takes the form of fluorescent lighting. For outdoor use, sodium and mercury vapor lights are used. These lights are often driven with a high voltage AC signal that is derived directly from the 60 Hz power line. Correspondingly, they produce one pulse of light when the applied voltage is on the positive half of the AC cycle, and an identical pulse of light on the negative half of the AC cycle. Accordingly, the light emitted from gas discharge lamps pulsates or flickers at twice the line frequency, i.e., 120 Hz. In parts of the world where the line frequency is 50 Hz, the light flicker from gas discharge lamps occurs at 100 Hz.

Figure 1:
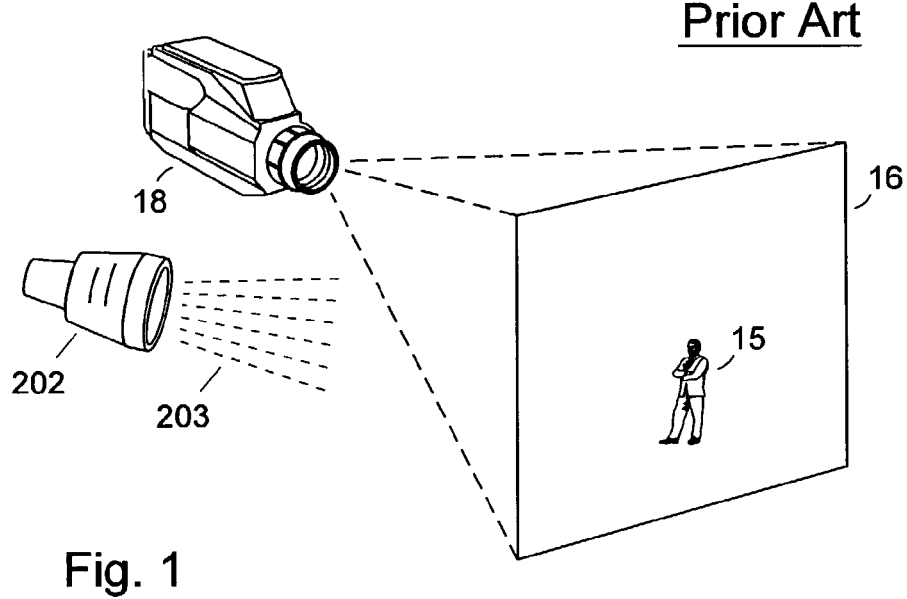
FIG. 1 is a schematic depiction of the prior art video surveillance system.

FIG. 1 illustrates how the prior art CCTV system eliminates lighting flicker. A CCTV camera 18 views the monitored area 16 containing, as an example, a person 15. The monitored area 16 is illuminated by a gas discharge lamp 202, producing light 203 that flickers at twice the power line frequency.

Figure 2A:
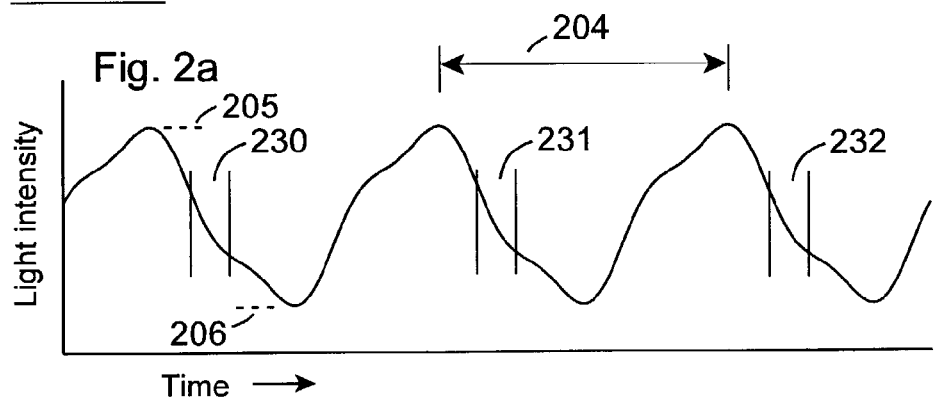
FIGS. 2A and 2B are graphs in accordance with the prior art video surveillance system.
Figure 2B:
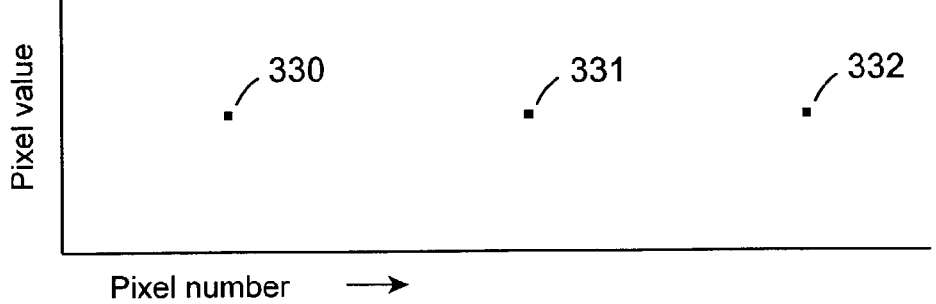

FIGS. 2A and 2B further illustrates how the prior art CCTV system eliminates lighting flicker. The graph in FIG. 2A shows a typical waveform of the light intensity received by the CCTV camera for a single pixel in the image. The waveform is periodic with period 204 corresponding to twice the power line frequency. The light has a maximum intensity 205 and a minimum intensity 206. With fluorescent lamp illumination, the maximum intensity 205 is typically two to three times the minimum intensity 206, a result of the fluorescent material continuing to emit a small amount of light during the zero crossings of the applied voltage. In sodium vapor lamps, and other gas discharge tubes that do not contain a fluorescent material, the minimum intensity 206 is zero. That is, during the zero crossings of the applied voltage the lamp produces no light output at all.

The CCTV camera 18 converts this periodic light intensity waveform into successive pixel values, one for each successive field or frame, as illustrated in FIG. 2B. Each pixel value in FIG. 2B is determined by integrating the light intensity over a fixed time interval. As illustrated, integrating over the time interval 230 produces pixel value 330. Likewise, integrating over time intervals 231 and 232 produce pixel values 331 and 332, respectively. The length of the time interval 230, 231, 232 is often adjustable in CCTV cameras, and is frequently used to set the amplitude of the video signal being produced. Integration times between 1/10,000 sec to 1/30 sec are common. What is most important, all of the integration time intervals 230, 231, 232 begin and end at exactly the same phase of the periodic illumination. This means that each of the successive pixel values 330, 331, 332 are derived from identical lighting conditions, thereby eliminating the effect of lighting flicker. To simplify the explanation, FIGS. 2A and 2B illustrate the operation of a camera that produces a pixel value 330, 331, 332 each 1/120 second. As can be appreciated by one skilled in the art, operating at image acquisition rates of 1/60 or 1/30 second, as is common in interlaced and noninterlaced CCTV video, respectively, will produce the same flicker immunity. In these cases, the integrating time intervals 230, 231, 232 occur every other period, or every fourth period, respectively, of the flicker periodicity.

While the prior art CCTV format is well matched to the needs of broadcast television, it is inefficient for surveillance use. The goal of surveillance video is to document the events that occur in an area. To fully achieve this goal, a video surveillance system must be able to record information that allows such tasks as: (1) identifying previously unknown persons by their facial features and body marks, such as tattoos and scars; (2) identifying automobiles by reading their license plates, recognizing their make and model, and recording distinguishing marks such as body damage; and (3) monitoring the actions of person's hands, such as the exchange of illicit drugs and money, the brandishing of weapons, and the manipulation or removal of property.

All these tasks require a spatial image resolution of approximately 80 pixels-per-foot, or greater. That is, the pixel size must be equal to, or small than, about 0.15 by 0.15 inches. Prior art CCTV systems operating with 640 by 480 pixel images can only achieve this minimally acceptable resolution when the field-of-view is set to be 8 by 6 feet, or smaller (i.e., in the horizontal direction: 640 pixels/8 ft.=80 pixels/ft.; in the vertical direction: 480 pixels/6 ft.=80 pixels/ft.). However, this maximum field-of-view for optimal operation is much smaller than typical locations that need to be monitored by surveillance video. For example, the lobby of a building might be 20 to 80 feet across, while a parking lot might be hundreds of feet in size.

The Invention overcomes these spatial resolution limitations of the prior art by acquiring with a large number of pixels per image, typically 5120 by 2048 or greater, and a slow frame rate, typically 2 images per second. FIG. 3 provides an illustration of the inventive system. A gas discharge lamp 202 produces a source of periodically varying light 203 that illuminates a monitored region 42. Monitored region 42 contains, as an example, a person 15. A linescan image sensor 63, with an active region 201, views a vertical line 46 in the monitored region 42, through the use of a focusing lens 48. The line rate of the linescan image sensor 63 is controlled by a line rate control signal 270. A mechanical scanner is used to repeatedly sweep the viewed vertical line in the horizontal direction, across the monitored area 42. In a preferred embodiment, the mechanical scanner consists of a mirror 47 mounted on a rotational servo 48, rotating the mirror around a vertical axis 49. In other preferred embodiments, the mechanical scanner consists of an oscillating mirror driven by a rotating cam, a multisided rotating mirror, a relative linear motion between the lens 48 and the image sensor 63, or a rotation of the lens 48 and the image sensor 63 around a vertical axis. All of these mechanical scanner configurations are described in U.S. Pat. No. 6,757,008, which is incorporated herein by reference. As the viewed vertical line 46 is swept horizontally across the monitored area 42, the linescan image sensor 63 produces a series of pixel values that collectively form an image of the monitored area 42. By repeating this action, images can be produced at periodic intervals, thereby forming the surveillance video stream.

The present Invention utilizes a linescan image sensor that is composed of a two-dimensional array of pixels, operating in a Time Delay Integration mode. To fully understand and appreciate the advantage of the Invention, the operation of the system with a one-dimensional linescan sensor will first be discussed. In this case, the linescan sensor active area 201 consists of a linear array of light sensitive sites, typically 1024 to 8192. As a typical example, the linear array sensor 63 may produce 2048 pixels per vertical line, and the horizontal sweeping action may produce 5120 of these vertical lines. This results in an acquired image consisting of 5120 by 2048 pixels representing the monitored region 42. Also as an exemplary value, the line rate may be 10,000 lines/second, which is the same as 0.1 msec/line, thereby acquiring a full image in 5120/10,000=0.512 seconds. The important point in this example is that each vertical line is acquired at a rate that is far above the flicker frequency of the gas discharge lamp 202. FIGS. 4A and 4B explain how this results in the performance of the system being degraded. The graph in FIG. 4A shows a typical waveform of the light intensity received by a single element of the linear array sensor 63, which has previously been described in conjunction with FIG. 2A. The light intensity is repeatedly integrated over fixed time intervals, exemplified by 210, 211, 212. Each interval typically lasts the entire line acquisition time, which is much shorter than the period of the flickering light intensity. As illustrated in FIG. 4B, each integration interval 210, 211, 212 results in a pixel value 310, 311, 312, respectively. For simplicity, FIG. 4B only shows 16 pixel values being generated per cycle of the flicker. In the typical case, the period of the flicker is 1/120=8.3 msec and a pixel is generated each 0.1 msec, resulting in approximately 83 pixels per cycle of the flicker.

The pixel values illustrated in FIG. 4B represent a horizontal line in the acquired image. As previously described, the light flicker from the gas discharge lamp modulates this horizontal line of data, thereby creating intense bright and dark vertical stripes in the acquired image. As can be appreciated by one skilled in the art, these vertical stripes are an extreme problem, virtually rendering the acquired image useless. When flourescent lamps are used, the maximum pixel value is typically 2–3 times the minimum pixel value. When sodium vapor lamps are used, the minimum pixel value falls completely to zero, thereby destroying all image information in the dark stripe regions. Further, the flicker component of the acquired signal is so large that it occupies nearly all of the dynamic range of the signal, such as 256 digital numbers or gray levels. This drastically reduces the dynamic range available to carry legitimate image information. All told, the above described linescan surveillance system, using a single pixel wide image sensor, is virtually useless with gas discharge lighting.

Figure 5:
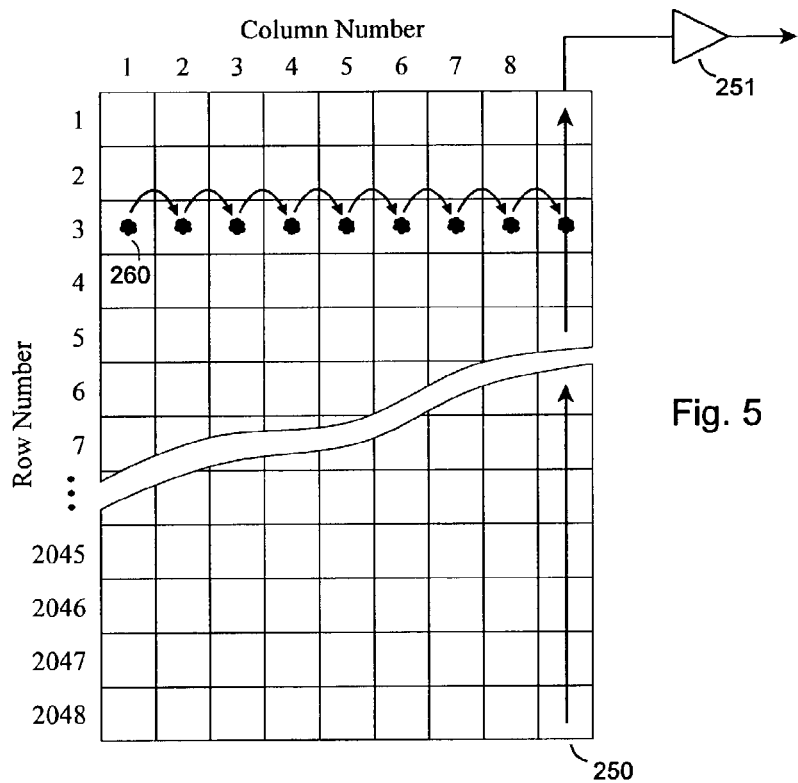
FIG. 5 is a schematic depiction in accordance with the inventive video surveillance system.

It is the goal of the present Invention to overcome these limitations of lighting flicker in linescan surveillance cameras. This is accomplished through the use of Time Delay Integration (TDI) image acquisition in conjunction with a specific line rate. TDI linescan cameras are well known in the art, being widely used to inspect printed documents and manufactured objects moving on conveyer belts. FIG. 5 shows an enlargement of the active area (201 in FIG. 3) of the TDI linescan image sensor. In this exemplary case, the active area consists of a two-dimensional array of 2048 rows by 8 columns of light sensitive regions or cells. In addition, the sensor contains a readout register 250, parallel and adjacent to column number 8, and a charge-sensitive amplifier 251. As is known in the art, TDI cameras operate by converting the light falling on each cell into an electronic charge. At the end of each line period, these charges are electronically moved one column toward the readout register 250. That is, the 2048 charges in column number 1 are transferred into the corresponding cells in column 2; those in column 2 transferred into column 3, and so on. The 2048 charges in column 8 are transferred into the readout register 250. Subsequently, the 2048 charges in the readout register are routed in serial to the charge-sensitive amplifier 251, where they are converted into an analog video signal.

As is also know in the art, TDI linescan cameras provide the same function as linescan cameras having only a single column, provided that the motion of the scene being viewed is synchronized to the line rate. In the present Invention this requires matching the horizontal sweeping speed of the viewed vertical line with the line rate. To explain this further, consider a small illuminated point at an arbitrary location within the region being monitored. During a particular line integration interval, the light from this point is focused onto one of the cells on the TDI image sensor. For illustrative purpose, we will assume that this cell is at column number 1 and row number 3 in FIG. 5. The incident light will therefore result in an accumulated charge 260. At the end of the line period, the accumulated charge 260, will be transferred to the adjacent cell, that is, it will be moved to column number 2 and row number 3. During this line interval the mechanical scanner will move by the amount required to redirect the light originating from the small illuminated point to the new cell. That is, the light from the small illuminated point will now be focused to column number 2 and row number 3, thereby allowing the charge to continue accumulating. This process continues with the charge subsequently being transferred to column number 3, and then 4 and then 5, and so on. Each time the charge is move, the mechanical scanner is moved by the required amount to keep the light from the small illuminated point being directed at the cell containing the charge. In this manner, the total accumulated charge is eight times that produced by any single column. In the general case, a TDI camera with T columns has T times the light sensitivity as a single column linescan camera.

Figure 6A:
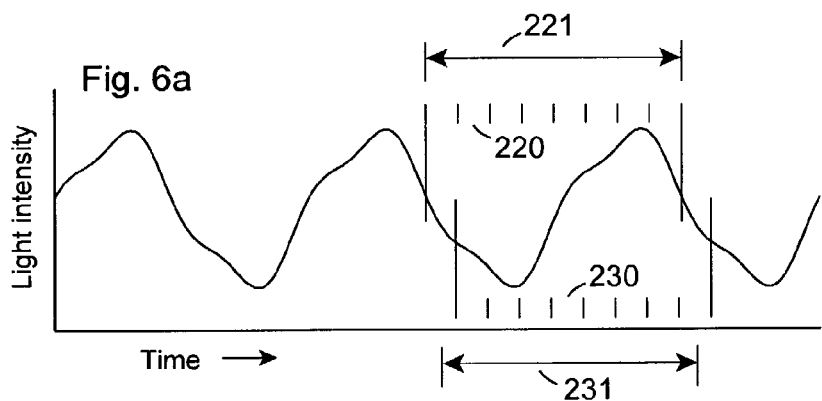
FIGS. 6A and 6B are graphs in accordance with the present Invention.
Figure 6B:
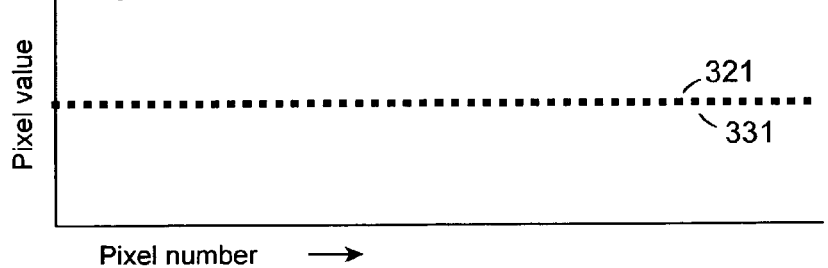

This increased sensitivity makes the TDI technique useful for linescan surveillance systems that are intended to operate in low light conditions. However, the present Invention incorporates a TDI camera for another reason, one that is unrelated to light sensitivity. The inventive system uses the TDI technique, in conjunction with an appropriately selected line rate, to eliminate the effects of flicker from gas discharge lamps. FIGS. 6A and 6B explain how the Invention accomplishes this improvement. The graph in FIG. 6A shows a typical waveform of the light intensity from a small illuminated point in the monitored area. In accordance with the above described TDI operation, this light is focused from column to column along a particular row in the TDI image sensor, in synchronisation with the line rate. As previously described in conjunction with FIGS. 2A and 4A, the intensity of this light is periodic with a frequency that is twice that of the power line frequency. That is, for a power line frequency of 60 Hz, the light intensity from the gas discharge lamp has a frequency of 120 Hz, or a period of approximately 8.3 msec. Using the exemplary case of the TDI sensor having eight columns, the charge will be accumulated in eight separate time intervals, corresponding to eight successive line periods. FIG. 6A shows the total integration time 221 of these eight time intervals, and an example of one of these eight time intervals 220. As known in the art and previously explained, the line rate in a TDI camera must be synchronized with the motion of the scene being viewed. In the present Invention, the line rate is additionally synchronized with the periodic flicker resulting from the gas discharge lamp. Specifically, the total integration time 221 is set to equal the period of the flicker, or an integer multiple thereof. In the exemplary case of FIG. 6A, the flicker period is approximately 8.3 msec, therefore the total integration time 221 is also 8.3 msec. Correspondingly, each line period is 8.3/8=1.042 msec, and the line rate is 1/1.042 msec=960 lines per second. The charge 260 developed during the total integration time 221 is converted into a pixel value 321. The important concept is that the total integration time 221 is equal to one or more complete cycles of the flicker, thereby eliminating the flicker in the signal produced by the image sensor. As another exemplary case, FIGS. 6A and 6B show the operation for the next pixel value produced by this row on the TDI image sensor. The next pixel value 331 corresponds to a total integration time 231, which is also formed from eight separate time intervals 230. While the total integration time 231 begins and ends one line period after the total integration time 221, both of these have a duration equal to the period of the flicker. As can be appreciated by one skilled in the art, the pixel values of FIG. 6B represent a horizontal line in the acquired image, and is free from the degrading effects of gas discharge lamp flicker.

The Invention uses the integration time of TDI scanning to null the periodic flicker from gas discharge lamps. In accordance with the above description and explanation, this can only be accomplished by using a line rate that is matched to the number of columns in the TDI sensor and the frequency of the flicker. Specifically, if the frequency of the power line driving the gas discharge lamp is represented by the symbol F, then the flicker occurs at a frequency of 2×F, and the flicker period is 1/(2×F). This requires that the total integration time 221 be equal to this time interval, or an integer multiple. That is, the total integration time must be N/(2×F), where N is an integer greater than zero. Further, the total integration time is equal to the line period multiplied by the number of columns in the TDI sensor. Combining the two expressions provides, LP×T=N/(2×F), where LP is the line period and T is the number of columns in the TDI sensor. Rewriting this equation provides an expression for the line period, LP=N/(2×F×T). Finally, the line rate can be found by taking the reciprocal of the line period, providing the line rate that must be used in the Invention: Line rate=2×F×T/N, where F is the power line frequency, T is the number of columns averaged in the TDI image sensor, and N is an integer greater than 0.

To further explain the operation and benefit of the Invention, it is useful to contrast its operation with the flicker elimination scheme used in the prior art. As previously explained in conjunction with FIG. 2A, conventional CCTV cameras acquire images in phase synchronization with the power line frequency. That is, the integration interval of each image can be of an arbitrary time, commonly between 1/10,000 second and 1/30 second. However, the beginning of each integration interval must occur at exactly the same point of the power line cycle. This insures that the lighting from image to image is the same, regardless of the level of lighting flicker. In short, prior art CCTV systems eliminate flicker by acquiring images in phase synchronization with the flicker, and the integration interval is of no importance.

In contrast, the present Invention eliminates flicker by setting the integration interval to a specific length, with the phase synchronization of data acquisition being of no importance. As illustrated in FIGS. 6A and 6B, each pixel produced by the Invention results from an integration over one or more complete cycles of the flicker. Further, it makes no difference where this integration starts on the flicker cycle, as can be shown in several ways. First, each of the successive pixel values produced by the present Invention will start at a different phase of the flicker cycle, as illustrated FIGS. 6A and 6B and previously explained. Second, the acquisition of each image can begin at an arbitrary time, and does not need to be synchronized to the flicker phase. Third, the line rate of the Invention, given by 2×F×T/N, does not need to be exact. For instance, if the line rate were 0.99 or 1.01 of this ideal value, the flicker would still be reduced in amplitude by about a factor of 100, which is sufficient for most surveillance applications. However, this slight difference in frequency would cause the phase relationship between the flicker and the line rate to change over time, a fact that is unimportant in the Invention. As thus shown, the present Invention provides flicker elimination in a manner that is completely different from prior art systems.

In a preferred embodiment of the Invention, the TDI camera is a commercial device providing 2048 rows and 96 columns, such a model EC-11-02k40 from Dalsa, Inc., Waterloo, Ontario. The lens 48 is a commercially available FL=35–75 mm, f#=1.4 device, such as widely used in 35 mm photographic cameras. The mechanical scanner consists of a rotational servo 48 rotating mirror 47 back-and-forth around a vertical axis 49. In the preferred embodiment, this is a galvanometer servo with positioning controlled through a microcontroller or other digital computer. Galvanometer servos of this type are well known in the art, and commercial products are manufactured by several companies, for example: model G300 from General Scanning, Inc., Watertown, Mass., or model 6880 from Cambridge Technology, Inc., Cambridge, Mass. In this preferred embodiment, the mirror 47 is approximately 2 by 2 inches in size, with the mirror 47 mounted as near the lens as possible, typically 1–2 inches. For typical operation of the preferred embodiment, the monitored area 42 may have a width of 80 feet, and be located at a distance 60 feet from the camera and mechanical scanner. To achieve the scanning of viewed line 46 across the monitored region 42, the rotational servo 48 rotates the mirror 47 through a total angle of arctan((w/2)/d), where w is the width of the monitored region and d is the distance to the monitored region. In this typical operation of the preferred embodiment, the total angle of rotation is arctan((80/2)/60)=33.7 degrees.

In the Invention, the line rate of the TDI camera is set to 2×F×T/N, where F is the power line frequency, T is the number of columns averaged in the TDI image sensor, and N is an integer greater than 0. For the preferred embodiment, F=60 Hz, T=96 columns, and N=1 to provide the quickest image acquisition. Therefore, the line rate of the preferred embodiment is 2×60×96/1=11,520 lines per second. This line rate is generated by a standard electronic circuit, such as a crystal controlled oscillator producing TTL level pulses into the line start input of the commercial TDI camera. The accuracy of this line rate only needs to be about 1%, and does not need to be locked in phase with the power line frequency. As thus described, the preferred embodiment acquires a 5120 by 2048 pixel image of an 80' by 32' monitored area at a line rate of 11,520 lines per second. Therefore, the image acquisition time is 5120/11,520=0.444 seconds, and the rotational servo must turn at a rate of 33.7 degrees/0.444 second=75.9 degrees per second. In accordance with the operation of the present invention, these operational parameters eliminate the lighting flicker produced by gas discharge lamps illuminating the region being monitored.

Having thus given the description of the preferred embodiments, it can be appreciated by those skilled in the art that many modifications are possible for particular applications and are within the scope of the present invention. Some of these modifications are described below.

Within the scope of the Invention, the linescan camera can be selected or modified to view particular wavelengths or intensities of electromagnetic radiation. This includes the use of light amplifiers to provide operation in low-light environments, infrared sensitive sensors for operation in total optical darkness, and color linescan cameras that simultaneously capture images in the red, green, and blue spectral bands. Other modifications within the scope of the Invention include using TDI linescan cameras with greater or fewer integrating columns, and greater or fewer rows. Likewise, it is within the scope of the Invention to change the focal length of the camera lens and the movement of the mechanical scanner to adjust the size of the monitored region. Further, it is within the scope of the Invention to generate the line rate timing in various ways known in the art of electronics. This includes external oscillators, dividing the pixel clock rate, phase lock loop synchronization to the power line frequency, and so on.

Although particular embodiments of the Invention have been described in detail for the purpose of illustration, various other modifications may be made without departing from the spirit and scope of the Invention. Accordingly, the Invention is not to be limited except as by the appended claims.

I claim:

1. Video surveillance apparatus for monitoring a region illuminated by gas discharge lighting, comprising:
    a linescan camera, said linescan camera viewing a vertical line in the monitored region, said linescan camera operating in a time-delay-integration mode with a multitude of light sensitive columns, said linescan camera operating with a line rate; and
    a scanner, said scanner sweeping the viewed vertical line horizontally across said monitored region in synchronization with said time-delay-integration mode of said linescan camera;
    wherein said line rate is substantially equal to twice the number of said light sensitive columns multiplied by the frequency of the power source driving said gas discharge lighting divided by an integer greater than zero.

2. The video surveillance apparatus as claimed in claim 1 wherein said scanner comprises a mirror mounted on a rotational servo.

3. The video surveillance apparatus as claimed in claim 1 wherein said frequency is from the group consisting of 50 cycles per second and 60 cycles per second.

4. The video surveillance apparatus as claimed in claim 2 wherein said frequency is from the group consisting of 50 cycles per second and 60 cycles per second.

5. The video surveillance apparatus as claimed in claim 1 wherein said number of said light sensitive columns is greater than 8.

6. The video surveillance apparatus as claimed in claim 1 wherein said frequency is 60 cycles per second, said number of said light sensitive columns is 96, said integer is one, and said line rate is substantially 2 times 60 cycles per second times 96 columns divided by 1 equaling 11,520 lines per second.

7. The video surveillance apparatus as claimed in claim 6 wherein said line rate is between 9,216 lines per second and 13,824 lines per second.

8. A method of acquiring a video image of a monitored region illuminated by flickering lighting, comprising:
   viewing a vertical line in said monitored region with a TDI linescan camera;
   scanning said vertical line horizontally across said monitored region; and
   acquiring a sequence of vertical profiles from said TDI linescan camera at a repetition rate, said repetition rate being substantially equal to the number of integrating columns in said TDI camera multiplied by the frequency of said flickering lighting divided by a positive integer.

9. A method of acquiring a video image claimed in claim 8, wherein said scanning consists of rotating a mirror.

10. A method of acquiring a video image claimed in claim 9, wherein said frequency of said flickering lighting is from the group 100 cycles per second and 120 cycles per second.

11. A method of acquiring a video image claimed in claim 8, wherein said number of integrating columns is 96, said frequency of said flickering lighting is 120 cycles per second, said positive integer is 1, and said repetition rate is substantially 96 columns times 60 cycles per second divided by 1 equaling 11,520 lines per second.

12. A method of acquiring a video image claimed in claim 11, wherein said repetition rate is between 9,216 lines per second and 13,824 lines per second.

13. A method of acquiring a video image claimed in claim 8, wherein said frequency of said flickering lighting is from the group 100 cycles per second and 120 cycles per second.

* * * * *